United States Patent
Sakamoto et al.

(10) Patent No.: US 6,906,161 B2
(45) Date of Patent: Jun. 14, 2005

(54) ROOM-TEMPERATURE CURABLE ORGANOPOLYSILOXANE COMPOSITION

(75) Inventors: Takafumi Sakamoto, Usui-gun (JP); Isao Iwasaki, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 88 days.

(21) Appl. No.: 10/610,572

(22) Filed: Jul. 2, 2003

(65) Prior Publication Data

US 2004/0006190 A1 Jan. 8, 2004

(30) Foreign Application Priority Data

Jul. 3, 2002 (JP) ........................................ 2002-194095

(51) Int. Cl.$^7$ ............................................. C08G 77/18
(52) U.S. Cl. .............................. 528/35; 528/34; 524/588
(58) Field of Search ....................... 528/34, 35; 524/588

(56) References Cited

U.S. PATENT DOCUMENTS

| | | | |
|---|---|---|---|
| 4,296,228 A | * | 10/1981 | Innertsberger et al. ........ 528/33 |
| 4,618,646 A | | 10/1986 | Takago et al. |
| 4,645,691 A | * | 2/1987 | Ona et al. .................... 427/180 |
| 4,652,624 A | * | 3/1987 | Allen et al. .................... 528/17 |
| 4,743,474 A | * | 5/1988 | Homan ........................ 427/387 |
| 5,013,800 A | | 5/1991 | Inoue |
| 5,468,829 A | * | 11/1995 | Bergstrom et al. ............ 528/18 |

* cited by examiner

*Primary Examiner*—Margaret G. Moore
(74) *Attorney, Agent, or Firm*—Oblon, Spivak, McClelland, Maier & Neustadt, P.C.

(57) ABSTRACT

A room-temperature curable organopolysiloxane composition is provided, which includes (A) an organopolysiloxane with the terminals blocked with a hydroxyl group, a hydrolysable group, or both these types of groups, and (B) an organosilicon compound containing a hydrolysable group, a partial hydrolysis-condensation product thereof, or a mixture of the two, and (C) a polysiloxane containing an oxyalkylene group bonded to a silicon atom via, for example, a C—C—Si linkage. Application of this composition to an underwater structure is able to generate an antifouling coating that is effective in preventing the adhesion and growth of aquatic organisms on the surface of the underwater structure, and displays superior long term endurance of this antifouling effect.

20 Claims, No Drawings

ROOM-TEMPERATURE CURABLE ORGANOPOLYSILOXANE COMPOSITION

BACKGROUND OF THE INVENTION

1. Field of the Invention

The present invention relates to a room-temperature curable organopolysiloxane composition which is ideal as a coating material, and particularly to a room-temperature curable organopolysiloxane which generates an antifouling coating and is ideal for applying to ships, port installations, buoys, pipelines, bridges, undersea bases, seabed oil field excavation equipment, water supply pipes for power generation stations, nets for aquatic farming, and fixed nets and the like (hereafter jointly described as "underwater structures") to prevent the adhesion and growth of aquatic organisms on the surface of such structures.

2. Description of the Prior Art

Many room-temperature curable silicone rubber compositions which generate rubber like elastic bodies at room temperature are already known. Cured rubbers obtained from room-temperature curable silicone rubber compositions display superior weather resistance, durability, heat resistance and cold resistance when compared with other organic-based rubbers, and are consequently widely used in many fields, particularly within the field of construction, where they are used for a variety of applications including as glass adhesives, adhesives between metals and glass, and as sealants between masonry joints. Furthermore, in recent years, they have also become widely used as coatings for building structures, production plants, and on the internal surfaces and external surfaces of water pipes.

However, the organopolysiloxanes which constitute one of the main components of these types of room-temperature curable silicone rubber compositions become easily charged and are prone to adsorbing dust from the atmosphere, and as a result, the surface of the cured sealing materials or coating materials became heavily soiled over time and lose their esthetic appearance. Examples of methods aimed at resolving this problem have proposed the addition of a surfactant-containing a polyoxyethylene group, a sorbitan residue or a disaccharide residue to the room-temperature curable silicone rubber composition (Japanese Laid-open publication (kokai) No. 56-76452 (JP56-76452A), and Japanese Laid-open publication (kokai) No. 56-76453 (JP56-76453A)). However, in order to obtain satisfactory effects with these methods, large quantities of the surfactant need to be added, causing a deterioration in the adhesion, which represents one of the most important functions for a sealing material or a coating material formed from a room-temperature curable silicone rubber composition.

Furthermore, when an underwater structure is installed or enters service, then aquatic organisms which live in the water of the river or sea, such as barnacles, ascidiacea, serupura, mussels, fresh-water mussels, bugula neritina, green laver and sea lettuce adhere and start growing on the structure, from the water surface contact region through to the submerged surfaces of the structure, which can generate a variety of problems. For example, when organisms adhere to the hull of a vessel, the friction resistance with the water increases, causing a reduction in the traveling speed of the ship or vessel, and consequently the fuel consumption required to maintain a constant speed increases, which is economically disadvantageous. Furthermore, when organisms adhere to structures secured either in, or on the surface of the water, such as port installations and the like, then ensuring satisfactory performance of the variety of functions of such structures becomes difficult, and erosion of the structure base material can also become a problem. In addition, when organisms adhere to nets used for aquatic farming, or to fixed nets and the like, then the openings within the net can become blocked causing fish to die.

Examples of countermeasures for preventing the adhesion and growth of aquatic organisms on underwater structures included the application of an antifouling paint containing a toxic antifouling agent such as an organotin compound or cuprous oxide to the structure. Although such measures substantially prevented the adhesion or growth of any aquatic organisms, the fact that the paint used a toxic antifouling agent meant that the environmental and hygiene conditions during production and application of the paint were undesirable, and furthermore when placed in the water, the toxic antifouling agent was gradually eluted from the paint film over time, meaning that there was a danger of polluting the water, and as a result the use of such antifouling paints has now been banned by law.

In contrast, paints which prevent the adhesion and growth of aquatic organisms, but contain no toxic antifouling agents, including non-toxic antifouling paints comprising a room-temperature curable silicone rubber composition to which is added a liquid paraffin or a petrolatum in order to lower the surface tension of the paint film and impart antifouling properties, have already been proposed (Japanese Laid-open publication (kokai) No. 58-13673 (JP58-13673A), Japanese Laid-open publication (kokai) No. 62-84166 (JP62-84166A)). Furthermore, non-toxic antifouling paint compositions which utilize the volumetric shrinkage accompanying the curing of a reaction curing type silicone resin, so that a silicone resin which contains an unreactive polar group and displays poor co-solubility with the aforementioned reaction curing type silicone resin bleeds out to the surface, thereby combining antifouling properties with the low surface tension of the reaction curing type silicone resin, have also been proposed (Japanese Patent publication No. 250398 (JP250398B), Japanese Patent publication No. 2952375 (JP2952375B)). However, in the non-toxic antifouling paint compositions described above, the aforementioned silicone resin which contains an unreactive polar group and displays poor co-solubility utilizes either a silicone resin with a polyoxyethylene group in which ethylene oxide or propylene oxide or the like are added via a C—C linkage to a Si atom, or a silicone resin in which an alkoxy group is introduced at a molecular terminal Si atom via an ethylene oxide or propylene oxide group, and consequently the compositions were unable to provide satisfactory performance in terms of the long term endurance of the antifouling properties.

SUMMARY OF THE INVENTION

An object of the present invention is to provide a room-temperature curable organopolysiloxane composition for producing an antifouling coating which is ideal for application to an underwater structure to prevent the adhesion and growth of aquatic organisms on the surface of the underwater structure, and displays superior long term endurance of the antifouling effect.

As a result of intensive investigations aimed at resolving the lack of endurance of the antifouling effect observed in the conventional technology, the inventors of the present invention discovered that by adding an oxyalkylene group-containing polysiloxane, in which, for example, an oxyalkylene group is bonded to a silicon atom via a C—C—Si linkage, to a room-temperature curable silicone rubber composition, extremely good antifouling properties and endurance of those properties could be achieved, and they were hence able to complete the present invention.

In other words, in order to achieve the above object, the present invention provides a room-temperature curable organopolysiloxane composition comprising:

(A) 100 parts by weight of a diorganopolysiloxane represented by a general formula (1) shown below:

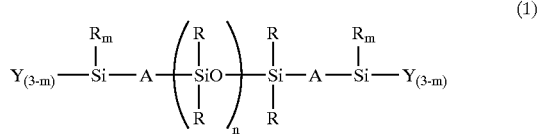

(wherein, each R represents, independently, an unsubstituted or substituted monovalent hydrocarbon group, each A represents, independently, an oxygen atom or a bivalent hydrocarbon group of 1 to 8 carbon atoms, each Y represents, independently, a hydroxyl group or a hydrolysable group, m represents an integer from 0 to 2, and n represents a number which results in a viscosity at 25° C. for this diorganopolysiloxane within a range from 20 to 1,000,000 mm²/s);

(B) 0.5 to 20 parts by weight of an organosilicon compound represented by a general formula (2) shown below, a partial hydrolysis-condensation product thereof, or a mixture of the two:

$$R^1{}_a SiX_{4-a} \qquad (2)$$

(wherein, each $R^1$ represents, independently, an unsubstituted or substituted monovalent hydrocarbon group of 1 to 6 carbon atoms, each X represents, independently, a hydrolysable group, and a represents an integer from 0 to 2); and (C) 1 to 60 parts by weight of an oxyalkylene group-containing organopolysiloxane with at least one group represented by a general formula (3) shown below bonded to a silicon atom within each molecule:

$$-R^2-Si(R^3)_2-O-(R^4O)_b-R^5 \qquad (3)$$

(wherein, $R^2$ represents a bivalent hydrocarbon group of 1 to 6 carbon atoms, each $R^3$ represents, independently, an unsubstituted or substituted monovalent hydrocarbon group of 1 to 6 carbon atoms, $R^4$ is an alkylene group of 2 to 4 carbon atoms, $R^5$ is an unsubstituted or substituted monovalent hydrocarbon group of 1 to 8 carbon atoms or a group represented by a formula —$R^6$—$SiX_3$ (wherein, X is as defined above, and $R^6$ is a bivalent hydrocarbon group of 1 to 6 carbon atoms), and b is an integer from 1 to 30).

DETAILED DESCRIPTION OF THE PREFERRED EMBODIMENTS

As follows is a more detailed description of the present invention.

[Constituent (A)]

An organopolysiloxane of the constituent (A) of the present invention is a primary constituent of a condensation curing type room-temperature curable organopolysiloxane composition of the present invention, and utilizes an organopolysiloxane represented by a general formula (1) shown below, in which the terminals of the molecular chain are blocked with a hydroxyl group and/or a hydrolysable group.

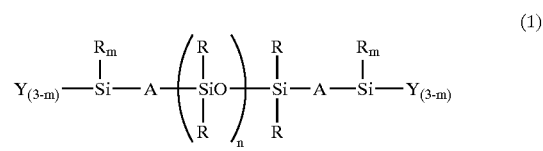

(wherein, R, A, Y, m and n are as defined above).

Specific examples of the aforementioned group R include alkyl groups such as methyl groups, ethyl groups, propyl groups, butyl groups, pentyl groups, hexyl groups, heptyl groups, octyl groups, nonyl groups, decyl groups and octadecyl groups; cycloalkyl groups such as cyclopentyl groups and cyclohexyl groups; alkenyl groups such as vinyl groups, allyl groups, butenyl groups, pentenyl groups and hexenyl groups; aryl groups such as phenyl groups, tolyl groups, xylyl groups and α- and β-naphthyl groups; aralkyl groups such as benzyl groups, 2-phenethyl groups and 3-phenylpropyl groups; and groups in which either a portion of, or all of the hydrogen atoms of the aforementioned groups have been substituted with halogen atoms such as F, Cl or Br, or cyano groups, such as 3-chloropropyl groups, 3,3,3-trifluoropropyl groups and 2-cyanoethyl groups.

Of these, methyl groups, vinyl groups and phenyl groups are preferred, and methyl groups are particularly preferred.

The organopolysiloxane of the constituent (A) is preferably of a degree of polymerization which results in a viscosity at 25° C. within a range from 20 to 1,000,000 mm²/s, and preferably from 100 to 500,000 mm²/s, and even more preferably from 1,000 to 50,000 mm²/s. If the viscosity is lower than 20 mm²/s (at 25° C.), then obtaining a coating film with excellent physical and mechanical strength becomes difficult, whereas in contrast, if the viscosity exceeds 1,000,000 mm²/s (at 25° C.), the viscosity of the composition becomes overly high, and the workability of the composition during use deteriorates.

Examples of suitable hydrolysable groups, other than the hydroxyl group, positioned at the molecular chain terminals within the aforementioned organopolysiloxane include alkoxy groups such as methoxy groups, ethoxy groups and propoxy groups; alkoxyalkoxy groups such as methoxyethoxy groups, ethoxyethoxy groups and methoxypropoxy groups; acyloxy groups such as acetoxy groups, octanoyloxy groups and benzoyloxy groups; alkenyloxy groups such as vinyloxy groups, isopropenyloxy groups and 1-ethyl-2-methylvinyloxy groups; ketoxime groups such as dimethylketoxime groups, methylethylketoxime groups and diethylketoxime groups; amino groups such as dimethylamino groups, diethylamino groups, butylamino groups and cyclohexylamino groups; aminoxy groups such as dimethylaminoxy groups and diethylaminoxy groups; and amide groups such as N-methylacetamide groups, N-ethylacetamide groups and N-methylbenzamide groups. Of these, alkoxy groups are preferred.

Specific examples of the organopolysiloxane of the constituent (A) include the compounds represented by the formulas shown below.

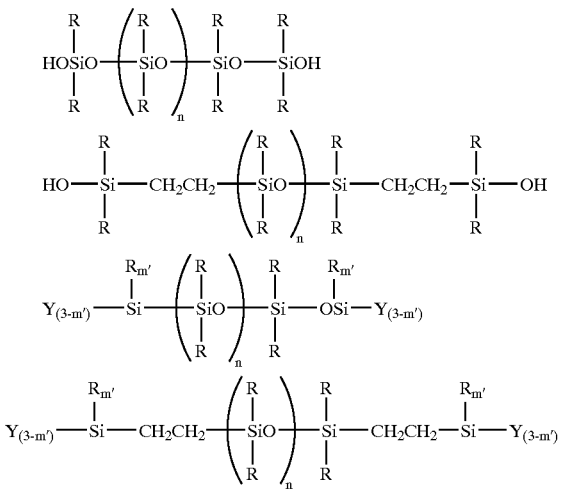

(In each of the above formulas, R and n are as per the definitions for the general formula (1) above, and m' is either 0 or 1.)

These materials may be used singularly, or in combinations of two or more different materials.

[Constituent (B)]

An organosilicon compound represented by a general formula (2) shown below, a partial hydrolysis-condensation product thereof, or a mixture of the two, which represents the constituent (B) of the present invention is an essential constituent, required for curing a composition of the present invention. Moreover, the organosilicon represented by the general formula (2) below must contain at least 2 hydrolysable groups bonded to silicon atoms within each molecule.

$$R^1{}_a SiX_{4-a} \qquad (2)$$

(wherein, $R^1$, X and a are as defined above)

Examples of the group X include the same groups described above as suitable hydrolysable groups, other than the hydroxyl group, at the molecular chain terminals within the organopolysiloxane of the aforementioned constituent (A), although of these groups, alkoxy groups, ketoxime groups and isopropenoxy groups are preferred.

With the exception of the requirement that the organosilicon compound of the constituent (B) must contain at least 2 of these hydrolysable groups (X) within each molecule, there are no particular restrictions on the constituent (B), although compounds with 3 or more hydrolysable groups are preferred. Furthermore, additional groups other than the hydrolysable groups may also be bonded to the silicon atom, and the molecular structure may be either a silane structure or a siloxane structure. Particularly in the case of siloxane structures, straight chain, branched chain or cyclic structures may be used.

Examples of the group $R^1$ include alkyl groups such as methyl groups, ethyl groups, propyl groups, butyl groups, pentyl groups and hexyl groups; cycloalkyl groups such as cyclopentyl groups and cyclohexyl groups; aryl groups such as phenyl groups and tolyl groups; aralkyl groups such as benzyl groups and 2-phenylethyl groups; alkenyl groups such as vinyl groups, allyl groups, butenyl groups, pentenyl groups and hexenyl groups; and halogenated alkyl groups such as 3,3,3-trifluoropropyl groups and 3-chloropropyl groups. Of these, methyl groups, ethyl groups, phenyl groups and vinyl groups are preferred.

Specific examples of the organosilicon compound of the constituent (B) of the present invention include ethyl silicate, propyl silicate, methyltrimethoxysilane, methyltriethoxysilane, vinyltrimethoxysilane, vinyltriethoxysilane, methyltris(methoxyethoxy)silane, vinyltris(methoxyethoxy)silane, methyltripropenoxysilane, methyltriacetoxysilane, vinyltriacetoxysilane, methyltris(methylethylketoxime)silane, vinyltris(methylethylketoxime)silane, phenyltris(methylethylketoxime)silane, propyltris(methylethylketoxime)silane, tetrakis(methylethylketoxime)silane, 3,3,3-trifluoropropyltris(methylethylketoxime)silane, 3-chloropropyltris(methylethylketoxime)silane, methyltris(dimethylketoxime)silane, methyltris(diethylketoxime)silane, methyltris(methylisopropylketoxime)silane and tetrakis(cyclohexanoxime)silane. These compounds may be used singularly, or in combinations of two or more different compounds. Furthermore, mixtures of an aforementioned organosilicon compounds and a partial hydrolysis-condensation product thereof may also be used as the constituent (B) of the present invention.

The quantity of the constituent (B) used is within a range from 0.5 to 20 parts by weight, and preferably from 1 to 10 parts by weight, per 100 parts by weight of the constituent (A). At quantities less than 0.5 parts by weight, the degree of cross linking is inadequate, whereas in contrast if the quantity exceeds 20 parts by weight, the cured product becomes overly hard and is also economically less viable.

[Constituent (C)]

An oxyalkylene group-containing organopolysiloxane of the constituent (C) of a composition of the present invention, with at least one group represented by a general formula (3) shown below bonded to a silicon atom within each molecule is an important constituent in achieving the characteristics of a room-temperature curable composition of the present invention.

$$-R^2-Si(R^3)_2-O-(R^4O)_b-R^5 \qquad (3)$$

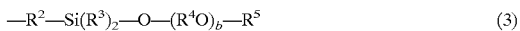

(wherein, $R^2$ represents a bivalent hydrocarbon group of 1 to 6 carbon atoms, each $R^3$ represents, independently, an unsubstituted or substituted monovalent hydrocarbon group of 1 to 6 carbon atoms, $R^4$ is an alkylene group of 2 to 4 carbon atoms, $R^5$ is an unsubstituted or substituted monovalent hydrocarbon group of 1 to 8 carbon atoms or a group represented by a formula $-R^6-SiX_3$ (wherein, X is as defined above, and $R^6$ is a bivalent hydrocarbon group of 1 to 6 carbon atoms), and b is an integer from 1 to 30)

Specific examples of the group $R^2$ include bivalent hydrocarbon groups such as $-CH_2CH_2-$, $-CH_2CH_2CH_2-$, $-CH_2CH_2CH_2CH_2-$, $-CH_2CH_2CH_2CH_2CH_2-$ and $-CH_2CH_2CH_2CH_2CH_2CH_2-$, and of these, $-CH_2CH_2-$ and $-CH_2CH_2CH_2-$ are preferred and $-CH_2CH_2-$ groups are particularly preferred.

Examples of the group $R^3$ include the same monovalent hydrocarbon groups as those listed for the group $R^1$ in the aforementioned general formula (2).

Examples of the group $R^4$ include alkylene groups such as $-CH_2CH_2-$, $-CH_2CH_2CH_2-$ and $-CH_2CH_2CH_2CH_2-$, and of these, $-CH_2CH_2-$ and $-CH_2CH_2CH_2-$ are preferred, and $-CH_2CH_2-$ groups are particularly preferred.

Furthermore, the number of repeating units of the aforementioned ($R^4O$), namely the value b, is an integer within a range from 1 to 30, and preferably from 2 to 20, and even more preferably from 3 to 15.

Furthermore, examples of the group $R^5$, in those cases in which the group is an unsubstituted or substituted monovalent hydrocarbon group of 1 to 8 carbon atoms, include alkyl groups such as methyl groups, ethyl groups, propyl groups, butyl groups, pentyl groups, hexyl groups, heptyl groups and octyl groups; cycloalkyl groups such as cyclopentyl groups and cyclohexyl groups; aryl groups such as phenyl groups, tolyl groups and xylyl groups; aralkyl groups such as benzyl groups and phenethyl groups; and alkenyl groups such as vinyl groups, allyl groups, butenyl groups, pentenyl groups and hexenyl groups, and of these, methyl groups, ethyl groups, propyl groups, butyl groups, vinyl groups and allyl groups are preferred, and allyl groups are particularly preferred.

In those cases in which the group $R^5$ is a group represented by the formula $-R^6-SiX_3$ (wherein, X is as defined above, and each $R^6$ represents, independently, a bivalent hydrocarbon group of 1 to 6 carbon atoms), examples of the group $R^6$ include the same bivalent hydrocarbon groups as those listed for the aforementioned group $R^2$.

Furthermore, the HLB value of the constituent (C) is typically within a range from 1 to 5, and preferably from 2 to 4. By ensuring an HLB value within this range, the antifouling properties of the composition, particularly relative to aquatic organisms, can be improved.

In addition, the oxyalkylene group-containing organopolysiloxane of the constituent (C) must contain at least 1 group represented by the aforementioned general formula (3) bonded to a silicon atom within each molecule, and the number of these groups within each molecule is typically within a range from 1 to 10, and preferably from 1 to 5 groups.

The constituent (C) is preferably an oxyalkylene group-containing organopolysiloxane represented by a formula (4) shown below:

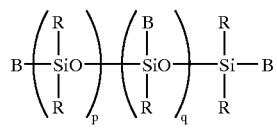

(4)

(wherein, each R represents, independently, an unsubstituted or substituted monovalent hydrocarbon group; each B represents, independently, a group R as defined above, a hydroxyl group, an alkoxy group or a group represented by the aforementioned general formula (3), and of the plurality of groups B, at least 1 group is a group represented by the general formula (3); p is a number of 1 or greater, q is a number of 0 or greater, and p+q is a number which results in a viscosity at 25° C. for this organopolysiloxane within a range from 5 to 100,000 mm²/s, and preferably from 10 to 10,000 mm²/s, and even more preferably from 20 to 5,000).

This oxyalkylene group-containing organopolysiloxane of the constituent (C) can be easily produced by performing an addition reaction of a vinyldimethylchlorosilane, represented by a formula (a) shown below, to an organohydrogenpolysiloxane comprising a hydrogen atom bonded to a silicon atom, in the presence of a hydrosilylation reaction catalyst such as platinum black or chloroplatinic acid,

  (a)

thereby forming a polysiloxane with a group containing a [—C—C—Si—Cl] structure as represented by a formula (b) shown below,

  (b)

and subsequently conducting a dehydrochlorination between this polysiloxane and a (poly)oxyalkyleneallyl ether represented by a general formula (c) shown below, comprising an OH group at one terminal of the molecular chain and with the other terminal blocked with an allyl group, in the presence of triethylamine or the like,

  (c)

(wherein, b is an integer from 1 to 30)
thereby forming an oxyalkylene group-containing organopolysiloxane corresponding with the constituent (C) of the present invention and comprising a group with a structure represented by a formula (d) shown below:

  (d)

(wherein, b is as defined above).

In addition, by performing an addition reaction of, for example, a compound represented by a general formula (e) shown below to the group of the structure represented by the formula (d) above, in the presence of the same type of hydrosilylation reaction catalyst as defined above,

  (e)

(wherein, X is as defined above)
an oxyalkylene group-containing organopolysiloxane corresponding with the constituent (C) of the present invention and comprising a group with a structure represented by a formula (f) shown below can be easily produced.

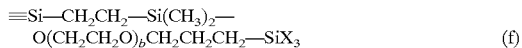  (f)

(wherein, X and b are as defined above).

Needless to say, by following the above production methods, and altering the compounds supplied to the various reactions, oxyalkylene group-containing organopolysiloxanes corresponding with the constituent (C) of the present invention and comprising different structures from those presented above can also be produced.

The organohydrogenpolysiloxane with a hydrogen atom bonded to a silicon atom that is supplied to the reaction described above must have at least 1, and preferably from 1 to 10 of these hydrogen atoms within each molecule. Examples of this organohydrogenpolysiloxane include dimethylpolysiloxane in which one terminal of the molecular chain is blocked with a dimethylhydrogensiloxy group and the other terminal is blocked with a trimethylsilyl group, dimethylpolysiloxane in which both terminals of the molecular chain are blocked with dimethylhydrogensiloxy groups, dimethylsiloxane-methylhydrogensiloxane copolymers in which both terminals of the molecular chain are blocked with trimethylsiloxy groups, and organosiloxane copolymers formed from siloxane units represented by the formula $(CH_3)_3SiO_{1/2}$, siloxane units represented by the formula $(CH_3)_2HSiO_{1/2}$, and siloxane units represented by the formula $SiO_2$. These organohydrogenpolysiloxanes may be used singularly or in combinations of two or more compounds.

The oxyalkylene group-containing polysiloxane of the constituent (C) comprises a hydrolysable group, namely a group represented by the formula $-OR^5$ (wherein, $R^5$ is as defined above) or the group X, and consequently by adding this constituent (C) to a composition containing the aforementioned constituent (A) and the constituent (B), the constituent (C) will also participate in the condensation reaction during room temperature curing of the composition, and as a result, structures derived from the constituent (C) will also be incorporated into the product cured film. However, the Si—O—C bonds within the aforementioned structures derived from the constituent (C) are easily hydrolyzed, and as a result, the hydrolyzed components tend to undergo blooming and bleed out from the surface of the cured film. These components display extremely good surface activity, and are consequently able to prevent the adhesion of aquatic organisms to the silicone cured rubber film. In other words, it is thought that these components which undergo blooming at the surface of the film function as surfactants, thereby preventing the adhesion of aquatic organisms and contributing to an antifouling effect.

The quantity of the constituent (C) must be within a range from 1 to 60 parts by weight, and is preferably within a range from 5 to 50 parts by weight, and even more preferably from 10 to 40 parts by weight, per 100 parts by weight of the constituent (A). If the quantity of the constituent (C) is less than 1 parts by weight then the effects of the addition are not discernible, whereas in contrast, if the quantity exceeds 60 parts by weight, the cured film may become non-transparent or undergo softening.

[Other Constituents]

A catalyst for accelerating the curing process may also be added to a composition of the present invention. Examples of this type of curing catalyst include the wide variety of materials used with condensation curing type room-temperature curable compositions. Specific examples include metal salts of organic carboxylic acids such as lead 2-ethyloctoate, dibutyl tin dioctoate, dibutyl tin diacetate, dibutyl tin dilaurate, dibutyl tin 2-ethylhexoate, iron 2-ethylhexoate, cobalt-2-ethylhexoate, manganese 2-ethylhexoate, zinc 2-ethylhexoate, stannous caprylate, tin naphthenate, tin oleate, tin butyrate, titanium naphthenate, zinc naphthenate, cobalt naphthenate and zinc stearate; titanate esters such as tetrabutyl titanate, tetra(2-ethylhexyl) titanate, triethanolamine titanate and tetra(isopropenyloxy) titanate; titanium compounds such as organosiloxy titanium and β-carbonyl titanium; alkoxy aluminum compounds; aminoalkyl group substituted alkoxysilanes such as 3-aminopropyltriethoxysilane and N-(trimethoxysilylpropyl)ethylenediamine; amine compounds and the salts thereof such as hexylamine and dodecylamine phosphate; quaternary ammonium salts such as benzyltriethylammonium acetate; alkali metal salts of lower aliphatic acids such as potassium acetate, sodium acetate and lithium oxalate; dialkylhydroxylamines such as dimethylhydroxylamine and diethylhydroxylamine; as well as guanidine compounds and guanidyl group-containing silanes or siloxanes such as the compounds represented by the formula below.

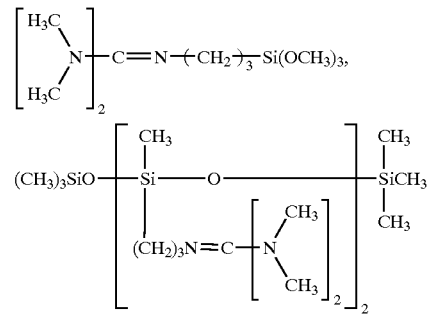

These catalysts may be used singularly, or in combinations of two or more compounds.

In those cases in which a curing catalyst such as that described above is added, there are no particular restrictions on the quantity of the catalyst, and an effective catalytic quantity is adequate. Typical quantities are from 0.01 to 20 parts by weight, and preferably from 0.1 to 10 parts by weight, per 100 parts by weight of the constituent (A). In those cases in which a catalyst is used, if the quantity of the catalyst is less than the lower limit of the above range then, depending on the variety of cross linking agent used, the curability of the product composition may be inadequate, whereas if the quantity exceeds the upper limit of the above range, the storage stability of the product composition may deteriorate.

In addition, a filler may also be added to a composition of the present invention, with the purpose of either reinforcing or extending the composition.

Examples of suitable fillers include fumed silica, treated silica in which the surface of a fumed silica is treated with an agent such as hexamethyldisilazane or cyclic dimethylsiloxane, precipitated silica, quartz, diatomaceous earth, titanium oxide, aluminum oxide, lead oxide, iron oxide, carbon black, bentonite, graphite, calcium carbonate, mica, clay, glass beads, glass microballoons, Shirasu-balloons, glass fiber, polyvinyl chloride beads, polystyrene beads and acrylic beads.

In addition, predetermined quantities of plasticizers; coloring agents such as pigments; flame resistance imparting agents, thixotropic agents; antimicrobial and antibacterial agents; or adhesion improvement agents including so-called carbon functional silanes with amino groups, epoxy group or thiol groups (such as γ-glycidoxypropyltrimethoxysilane and aminopropyltriethoxysilane) may also be freely added to a composition of the present invention as required, provided such addition does not impair the effects of the present invention.

EXAMPLES

As follows is a description of synthetic examples for the constituent (C) of the present invention, as well as a series of examples and comparative examples of the present invention. In each of the examples, the units "parts" refer to "parts by weight", and the viscosity values refer to values measured at 25° C.

[Constituent (C) Synthetic Example 1]

In a flask were placed 500 g of toluene and 3,431 g of a polysiloxane represented by an average structural formula shown below:

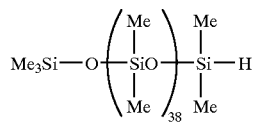

(wherein, Me represents a methyl group. This abbreviation is also used in subsequent formulas), and azeotropic water removal was performed under toluene reflux at 120° C. for 1 hour. Subsequently, the temperature was cooled to approximately 80° C., 2.5 g of a 2-ethylhexyl alcohol solution of chloroplatinic acid (concentration: 2% by weight) was added, and once a homogeneous solution had been obtained, 132.8 g of vinyldimethylchlorosilane was added gradually in a dropwise fashion to effect an addition reaction. Following completion of the dropwise addition, reaction was continued for 3 hours at 80 to 90° C., and once it was confirmed that the silicon atom bonded hydrogen atoms had disappeared, excess vinyldimethylchlorosilane was removed under reduced pressure at 100° C. and 10 mmHg. The reaction mixture was then cooled to room temperature, 500 g of toluene and 253 g of triethylamine were added to generate a homogeneous solution, and 410 g of a polyoxyethylene represented by a formula $CH_2=CH-CH_2(OC_2H_4)_8OH$, with a OH group at one terminal of the molecular chain and the other terminal blocked with an allyl group, was then added dropwise to effect a dehydrochlorination reaction. Following completion of the dropwise addition, reaction was continued for a further 1 hour at room temperature, and the produced salt was then filtered off using a filter, and the toluene was removed under reduced pressure at 100° C. and 10 mmHg. 3,550 g of a light yellow colored, transparent liquid compound represented by an average structural formula shown below was obtained.

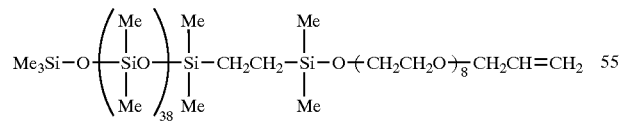

This compound had an HLB value of 2.0, a viscosity at 25° C. of 90 mm²/s, and a refractive index of 1.4114. This compound is named compound A.

Constituent (C) Synthetic Example 2

In a flask were placed 500 g of toluene and 1,963 g of the aforementioned compound A, and azeotropic water removal was performed under toluene reflux at 120° C. for 1 hour. Subsequently, the temperature was cooled to approximately 80° C., 2.5 g of a 2-ethylhexyl alcohol solution of chloroplatinic acid (concentration: 2% by weight) was added, and once a homogeneous solution had been obtained, 67.1 g of trimethoxysilane was added gradually in a dropwise fashion to effect an addition reaction. Following completion of the dropwise addition, reaction was continued for 3 hours at 80 to 90° C., and once it was confirmed that the silicon atom bonded hydrogen atoms had disappeared, excess trimethoxysilane was removed under reduced pressure at 100° C. and 10 mmHg. An oxyethylene group-containing methylpolysiloxane represented by an average structural formula shown below was obtained.

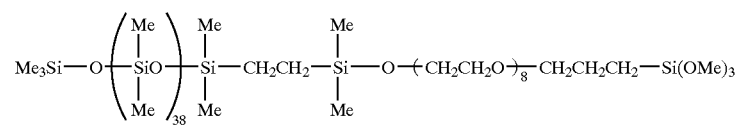

This compound had an HLB value of 2.0, a viscosity at 25° C. of 110 mm²/s, and a refractive index of 1.4117. This compound is named compound B.

Synthetic Example 3 (For Comparison)
<An Oxyethylene Group-Containing Polysiloxane with Si—C—C Linkages>

In a flask were placed 500 g of toluene and 3,431 g of a polysiloxane represented by an average structural formula shown below:

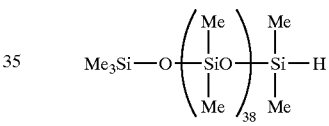

and azeotropic water removal was performed under toluene reflux at 120° C. for 1 hour. Subsequently, the temperature was cooled to approximately 80° C., 2.5 g of a 2-ethylhexyl alcohol solution of chloroplatinic acid (concentration: 2% by weight) was added, and once a homogeneous solution had been obtained, 410 g of a polyoxyethylene represented by a formula $CH_2=CH-CH_2(OC_2H_4)_8OH$, with a OH group at one terminal of the molecular chain and the other terminal blocked with an allyl group, was added gradually in a dropwise fashion to effect an addition reaction. Following completion of the dropwise addition, reaction was continued for 3 hours, and once it was confirmed that the silicon atom bonded hydrogen atoms had disappeared, the toluene was removed under reduced pressure at 100° C. and 10 mmHg. 3,650 g of a light yellow colored, transparent liquid compound represented by an average structural formula shown below was obtained.

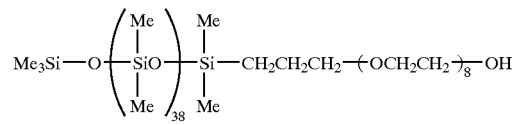

This compound had a viscosity at 25° C. of 98 mm²/s, and a refractive index of 1.4116. This compound is named compound C.

Synthetic Example 4 (For Comparison)
In a flask were placed 100 g of toluene and 396 g (0.1 mol) of the compound obtained in the synthetic example 3, and azeotropic water removal was performed under toluene reflux at 120° C. for 1 hour. The temperature was then cooled to approximately 80° C. Subsequently, 30.4 g (0.2 mol) of tetramethoxysilane was added to the reaction system, a condensation reaction was conducted for 6 hours at 120° C., and the toluene was then removed under reduced pressure at 100° C. and 10 mmHg. A compound represented by an average structural formula shown below was obtained.

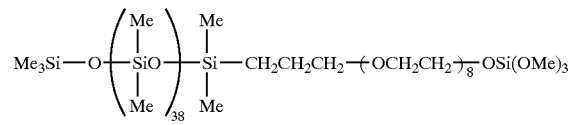

This compound is named compound D.

Example 1

(A) 90 parts of α,ω-dihydroxy-dimethylpolysiloxane with a viscosity at 25° C. of 1,500 mm²/s, and 15 parts of fumed silica with a specific surface area of 200 m²/g were mixed together uniformly, and the mixture was then mixed under heating and reduced pressure for 2 hours at 150° C. To this mixture was added (B) 12 parts of vinyltris(methylethylketoxime)silane and 1 part of γ-glycidoxypropyltrimethoxysilane, and mixing was continued under reduced pressure until a uniform mixture was achieved.
Finally, (C) 20 parts of the aforementioned compound A were added and mixing was continued under reduced pressure until a uniform mixture was achieved, thereby completing preparation of a composition of the present invention.

Example 2

With the exception of replacing the compound A in the example 1 with the aforementioned compound B, a composition was prepared in the same manner as the example 1.

Comparative Example 1

With the exception of not using the compound A, a composition was prepared in the same manner as the example 1.

Comparative Example 2

With the exception of replacing the compound A in the example 1 with the aforementioned compound C, a composition was prepared in the same manner as the example 1.

Comparative Example 3

With the exception of replacing the compound A in the example 1 with the aforementioned compound D, a composition was prepared in the same manner as the example 1.

<Performance Test Results>

To the surface of a plate that had already been coated with an epoxy based corrosion proof paint (film thickness 200 μm), each of the compositions produced in the above examples and comparative examples was applied in sufficient quantity to produce a cured film thickness of 300 μm, thereby forming a coated test plate. The coated test plates prepared in this manner were cured for 7 days under conditions of 23° C. and 50% RH. Following curing, the coated test plates were suspended in the sea off the coast of Mie prefecture at a depth of 1.5 m, and were observed over a period of 12 months. In other words, the degree of adhesion of seaweeds and shellfish such as barnacles was determined by visual inspection. The results are shown in Table 1.

TABLE 1

|  | Example 1 | Example 2 | Comparative example 1 | Comparative example 2 | Comparative example 3 |
|---|---|---|---|---|---|
| Organopolysiloxane | Compound A | Compound B | None | Compound C | Compound D |
| State of adhesion after 3 months | No adhesion | No adhesion | Large quantity of adhesion | No adhesion | No adhesion |
| State of adhesion after 6 months | No adhesion | No adhesion | Large quantity of adhesion | Some adhesion | Some adhesion |
| State of adhesion after 12 months | No adhesion | No adhesion | Large quantity of adhesion | Large quantity of adhesion | Large quantity of adhesion |

A coating formed from a room-temperature curable organopolysiloxane composition of the present invention is non-toxic, presents no environmental problems, and displays excellent antifouling properties, preventing the adhesion and growth of aquatic organisms on underwater structures for extended periods.

What is claimed is:

1. A room-temperature curable organopolysiloxane composition comprising:
   (A) 100 parts by weight of a diorganopolysiloxane represented by a general formula (1) shown below:

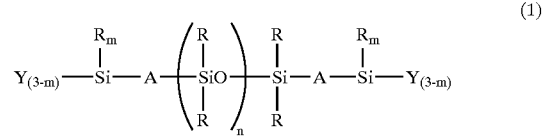

wherein, each R represents, independently, an unsubstituted or substituted monovalent hydrocarbon group, each A represents, independently, an oxygen atom or a bivalent hydrocarbon group of 1 to 8 carbon atoms, each Y represents, independently, a hydroxyl group or a hydrolysable group, m represents an integer from 0 to 2, and n represents a number which results in a viscosity at 25° C. for this diorganopolysiloxane within a range from 20 to 1,000,000 mm²/s;
   (B) 0.5 to 20 parts by weight of an organosilicon compound represented by a general formula (2) shown below, a partial hydrolysis-condensation product thereof, or a mixture of the two:

wherein, each R¹ represents, independently, an unsubstituted or substituted monovalent hydrocarbon group of 1 to 6 carbon atoms, each X represents, independently, a hydrolysable group, and a represents an integer from 0 to 2; and (C) 1 to 60 parts by weight of an oxyalkylene group-containing organopolysiloxane with at least one group represented by a general formula (3) shown below bonded to a silicon atom within each molecule:

  (3)

wherein, $R^2$ represents a bivalent hydrocarbon group of 1 to 6 carbon atoms, each $R^3$ represents, independently, an unsubstituted or substituted monovalent hydrocarbon group of 1 to 6 carbon atoms, $R^4$ is an alkylene group of 2 to 4 carbon atoms, $R^5$ is an unsubstituted or substituted monovalent hydrocarbon group of 1 to 8 carbon atoms or a group represented by a formula —$R^6$—Si$X_3$ where, X is as defined above, and $R^6$ is a bivalent hydrocarbon group of 1 to 6 carbon atoms, and b is an integer from 1 to 30.

2. The composition according to claim 1, wherein said constituent (C) is a compound represented by a general formula (4) shown below:

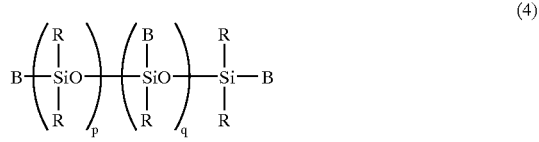  (4)

wherein, each R represents, independently, an unsubstituted or substituted monovalent hydrocarbon group; each B represents, independently, a group R as defined above, a hydroxyl group, an alkoxy group or a group represented by said general formula (3), and of a plurality of groups B, at least 1 group is a group represented by said general formula (3); p is a number of 1 or greater, q is a number of 0 or greater, and p+q is a number which results in a viscosity at 25° C. for this organopolysiloxane within a range from 5 to 100,000 mm$^2$/s.

3. The composition according to claim 1, wherein a HLB value of said constituent (C) is within a range from 1 to 5.

4. The composition according to claim 1, wherein said group represented by said general formula (3) within said constituent (C) is a group represented by a structural formula shown below:

wherein, b is as defined above.

5. The composition according to claim 1, wherein said group represented by said general formula (3) within said constituent (C) is a group represented by a structural formula shown below:

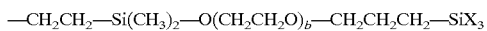

wherein, b and X are as defined above.

6. The composition according to claim 1, wherein said group X within said general formula (2) representing an organosilicon compound of said constituent (B) is an alkoxy group, an alkenyloxy group or a ketoxime group.

7. The composition according to claim 1, wherein (C) is represented by the following average structural formula:

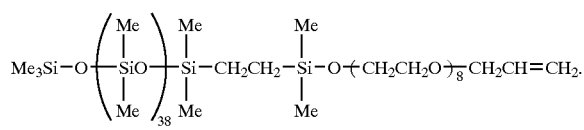

8. The composition as claimed in claim 1, wherein (C) is represented by the following average structural formula:

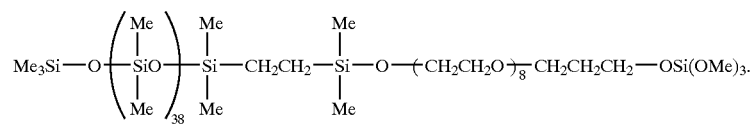

9. The composition according to claim 1, further comprising a glycidoxyalkyltrialkoxy silane and a vinyltris (ketoxime)silane.

10. The composition of claim 1, further comprising vinyltris(methylethylketoxime)silane and γ-glycidoxypropyltrimethoxysilane.

11. The composition of claim 1, wherein the group R of formula (1) is at least one selected from the group consisting of methyl, vinyl and phenol.

12. The composition according to claim 1, wherein X of formula (2) is at least one selected from the group consisting of an alkoxy group, a ketoxime group and an isopropinoxy group.

13. The composition of claim 1, further comprising a curing catalyst.

14. The composition according to claim 13, wherein the curing catalyst is a metal salt of an organic carboxylic acid.

15. The composition of claim 1, further comprising silica.

16. The composition of claim 1, further comprising a plasticizer.

17. The composition of claim 1, comprising

αω-dihydroxy-dimethylpolysiloxane;

vinyltris(methylethylketoxime)silane;

silica;

γ-glycidoxypropyltrimethoxysilane; and a compound represented by the following average structural formula:

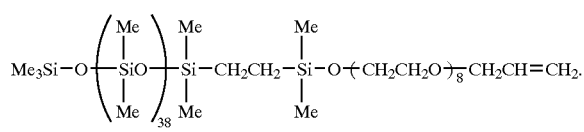

18. An underwater structure coated with the composition according to claim 1.

19. A process for inhibiting the fouling of a substrate in a marine environment, comprising:
   applying the composition according to claim 1 on a substrate;
   allowing the composition to cure; and
   exposing the substrate having the cured composition to a marine environment, wherein the substrate with the cured composition has less fouling in the underwater environment than the substrate without the cured composition.

20. The process as claimed in claim 19, wherein the substrate is first coated with an epoxy paint before the composition is applied.

* * * * *